United States Patent [19]

Tear et al.

[11] 4,448,609

[45] May 15, 1984

[54] PROCESS FOR THE PRODUCTION OF AQUEOUS DISPERSIONS OF PIGMENTARY TITONIUM DIOXIDE

[75] Inventors: Brian Tear, Cleethorpes; David G. Othen, Grimsby, both of England

[73] Assignee: Laporte Industries Limited, London, England

[21] Appl. No.: 361,888

[22] Filed: Mar. 25, 1982

[30] Foreign Application Priority Data

Apr. 10, 1981 [GB] United Kingdom ............... 8111319

[51] Int. Cl.³ .......................... C09C 1/36; C09C 3/02; C08J 3/00
[52] U.S. Cl. ............................. 106/308 N; 106/288 B; 106/288 Q; 106/308 R; 106/308 B; 106/308 Q; 106/309; 106/300; 252/356
[58] Field of Search ................ 106/300, 309, 308 N, 106/308 R, 288 Q, 288 B, 308 Q, 308 B

[56] References Cited

U.S. PATENT DOCUMENTS

| | | | |
|---|---|---|---|
| 3,172,772 | 3/1965 | Rowe | 106/300 |
| 3,567,479 | 3/1971 | Portes et al. | 106/300 |
| 3,653,936 | 4/1972 | Wolf et al. | 106/309 X |
| 3,702,773 | 11/1972 | Hall et al. | 106/300 |
| 3,942,999 | 3/1976 | Hinley et al. | 106/300 |

*Primary Examiner*—Floyd D. Higel
*Attorney, Agent, or Firm*—Kane, Dalsimer, Kane, Sullivan and Kurucz

[57] ABSTRACT

Stable high concentration aqueous slurries of pigmentary metal oxide particles having a hydrous oxide surface-treatment comprising alumina, for example alumina surface-treated pigmentary titanium dioxide, may be formed by the use of a specified combination of anionic and amine dispersants and a milling in the presence of grinding elements, for example in a sand mill, to develop suitable viscosity and gloss characteristics. The slurries may show thixotropic properties and are suitable for incorporation in vinyl silk aqueous emulsion paints.

8 Claims, No Drawings

PROCESS FOR THE PRODUCTION OF AQUEOUS DISPERSIONS OF PIGMENTARY TITONIUM DIOXIDE

BACKGROUND OF THE INVENTION

1. Field of the Invention

This invention relates to aqueous slurries of pigmentary metal oxides, such as titanium dioxide. Reference hereafter to slurries is to such aqueous slurries.

2. Brief Description of the Prior Art

Physically stable high solids concentration pigmentary metal oxide slurries suitable for direct incorporation into aqueous paint or paper media represent the possibility of large cost savings to the paint or paper manufacturer compared with the use of dry pigmentary metal oxide powder which is often difficult to disperse in the paint or paper medium in question. Such slurries, however, are subject to the exacting requirement of remaining relatively stable during transport from the producer to the user even under fluctuating temperature conditions which may include below zero centigrade conditions and during what may be a relatively prolonged period of storage either by the producer or the user, but neverless being sufficiently flowable for delivery when required for use. The slurries are also subject to the requirement of giving acceptable pigmentary properties, preferably fully comparable with those obtainable when dry finished pigment is used directly. One example of an important pigmentary property is the gloss value of aqueous emulsion "vinyl gloss" paints containing the slurries. It is highly desirable for the slurries to be in gel form, preferably thixotropic gel form. This assists in preventing sedimentation under conditions of no, or low, shear while allowing the slurry to be delivered readily after the application of shear by mixing or, even, by movement under its own weight.

It is possible to prepare high concentration pigment slurries from previously dried and milled pigment. The drying and milling of a pigment requires the input of a very large amount of energy if satisfactory properties are to be achieved and it would be of considerable economic advantage to the pigment producer if pigment slurries having a satisfactory combination of properties to enable it to be transported and stored while retaining its pigmentary properties such as gloss in use were to be prepared directly from damp pigment resulting from the conventionally used surface treatment with inorganic oxides or, otherwise, from undried pigment.

SUMMARY OF THE INVENTION

The present invention provides a process for the production of an aqueous slurry of pigmentary metal oxide particles characterised by forming an aqueous dispersion of washed pigmentary metal oxide particles which have been surface treated with one or more hydrous oxides comprising alumina, raising the solids concentration of the particles in the dispersion to above 60% by weight, introducing into the dispersion, before or after the solids concentration thereof has been raised a combination of dispersants comprising an amine dispersant and an anionic dispersant and milling the raised solids concentration dispersion, containing the combination of dispersants, in the presence of grinding elements to improve the gloss and viscosity characteristics, in use, of the pigmentary metal oxide particles therein.

For the avoidance of doubt the term 'dispersant' is used without any connotation of concentration, and includes a wet filter-cake, unless otherwise specified and the 'combination' of dispersants may be made by adding the dispersants separately to the dispersion if desired.

Preferably the raised solids concentration dispersion has a solids concentration not above 85% preferably not above 80% by weight.

Suitable milling machines utilising grinding elements are for example, ball mills, bead mills or sand mills. It is found that the attrition provided by such elements is an important feature in attaining the properties the object of this invention.

DETAILED DESCRIPTION OF THE INVENTION

According to the invention the anionic dispersant is required in at least a very small quantity to render the dispersion processable although, if present in too large a quantity, it greatly reduces the gloss properties obtainable. Suitably, the anionic dispersant is used in at least 0.04% by weight of the hydrous oxide surface treated particles. The quantity of anionic dispersant is, preferably, not more than 1.0%, although to obtain good gloss values it is, most preferably, present in less than 0.75%, for example, particularly less than 0.6%. The anionic dispersant, very suitably, comprises a polymeric salt of a carboxylic acid such a sodium, potassium or ammonium polyacrylate, a sodium potassium or ammonium polyphosphate or pyrophosphate, or other anionic dispersant known in the art such as a water-soluble citrate, silicate or tartrate.

The amine dispersant may be, for example, diethylamine, triethylamine, morpholine, 2-amino-2-methyl-1-propanol, N,N-dimethylethanolamine, N,N-diethylethanolamine, monoisopropanolamine, diisopropanolamine, diethanolamine, triethanolamine, 2-amino-2-hydroxymethyl 1,3-propandiol or one or more other amine dispersants known in the art.

The selection of a particular amine dispersant may have a considerable effect on the gloss and viscosity characteristics obtained and it may be desirable to adjust, for example, the duration of milling and/or the quantity of the anionic dispersant to attain an optimum combination of these two characteristics. The amine dispersant is, preferably, a secondary or tertiary amine. Particularly preferably the amine dispersant may be an alkanolamine in which the alkanol groups may, preferably, contain 2 or 3 carbon atoms. Preferably the amine dispersant is used in at least 0.3% particularly preferably at least 0.4% and in, preferably, not more than 2%, particularly preferably not more than 1%, by weight of the hydrous oxide surface-treated particles.

In general, too high a quantity of organic dispersant tends to be deleterious and the total quantity of the anionic and amine dispersants according to the invention is therefore, preferably not more than 3% by weight of the hydrous oxide surface treated particles.

The hydrous oxide surface treatment plays an important part in attaining the objects of this invention. The alumina surface treatment is present on the pigmentary metal oxide particles, preferably, in from 0.5% to 4% particularly preferably in from 1% to below 3%, for example, very suitably, from 1.5 to 2.5% by weight of the pigmentary metal oxide. Too high a quantity of alumina may render the surface coated metal oxide particles unprocessable which effect may begin to be felt even in the range of from 3% to 4% by weight of the pigmentary metal oxide. The alumina may, if desired to give a suitable dispersion charge, be accompanied by titania, which is present, preferably, in not more than 2.0% particularly preferably in not more than 1% by weight of the pigmentary metal oxide. The presence of silica in the surface treatment is found to detract markedly from the gloss properties obtainable. If present at all, the silica is, preferably present in less than 1%, particularly preferably in less than 0.5% by weight of the pigmentary metal oxide.

The hydrous metal oxide surface-treatment may be conducted by depositing a hydrous metal oxide or hydroxide onto the pigmentary metal oxide while the latter is dispersed in an aqueous medium. Above and hereafter the term "hydrous metal oxide" is used to refer to the surface treatment so formed whether, strictly chemically, it be in oxide or hydroxide form. The hydrous metal oxide may be precipitated in the aqueous medium from a suitable quantity of compounds dissolved or suspended in the aqueous medium which are directly convertable to the hydrous metal oxide or into a compound which is directly or indirectly so convertable. Preferred compounds are soluble in an aqueous medium and are precipitatable by the addition of alkali, since the end product of the invention is, preferably, alkaline. An example of such a compound is, for example, aluminium sulphate from which the hydrous oxide is precipitatable by the addition of sodium hydroxide. Other preferred compounds are precipitatable as the hydrous oxide by hydrolysis. An example of such a compound is titanium tetrachloride. Preferably, the hydrous metal oxide is precipitated at a pH of from 9 to 10.5. Yet other preferred compounds are precipitatable by reaction with a compound of another metal to produce a mixed oxide precipitate. An example of this is the formation of a mixed alumina/titania precipitate by the reaction between sodium aluminate and titanium tetrachloride. Preferably, the pigmentary metal oxide is surface treated at at least ambient temperature and, preferably below 100° C. The concentration of the pigmentary metal oxide during the surface treatment is preferably from 10% to 40% by weight. Surface-treatment with hydrous metal oxides is well known in the art and need not be further described herein.

The hydrous oxide surface-treated pigmentary metal oxide may be recovered from the aqueous medium in at which surface-treatment takes place by filtration. The resulting filter cake is preferably water washed and refiltered one or more times as may be necessary to remove salts formed in the course of the surface-treatment, or to suitably reduce the level of such salts or of other materials. The resulting washed filter-cake may be raised to a solids concentration greater than 60% by weight, as required, either by a variety of normal filtration techniques or, the case of relatively higher concentrations such as, for example, above 65% by weight, by high pressure filtration techniques, or by any other suitable technique. The raising of the solids concentration of the pigmentary metal oxide to that finally required may be accomplished or assisted by the incorporation of a proportion of already dried pigmentary metal oxide which has been alumina surface-treated. Clearly, the surface-treatment must be such as to allow for washing and filtration of the titanium dioxide. If the quantity of the added dried pigmentary metal oxide is small it is possible that a higher level of alumina treatment than that of the main body of titanium dioxide could be tolerated. Preferably however, the surface treatment of the added dried pigmentary metal oxide is according to the preferred, and particularly preferred, features identified above. The quantity of added dried pigmentary metal oxide is preferably not more than 60% and, particularly, preferably, less than 50% by weight of the surface-treated pigmentary metal oxide in the final slurry product.

The dispersants are added directly to the pigmentary metal oxide dispersion preferably, but not essentially, before it has been raised fully in concentration. Essentially, they are added before milling. This does not preclude the presence of dispersants in the paint or other medium to which the slurry is finally added in use.

Preferably, the dispersant-containing dispersion is milled until it gives a gloss value, tested as hereafter described, of at least 50 and preferably, at least 55, which latter figure is a typical one for vinyl gloss paints of commercial quality. Whether or not the indicated gloss value is first attained the milling is preferably continued until a gel structure is attained. In most instances it is found that the structure of the slurry improves progressively with the milling although in certain instances, for example when using certain primary amine dispersants, the viscosity may tend to rise to too high a value. Preferably the milling is controlled to bring the viscosity of the milled slurry, in centipoises, when measured on a Brookfield Viscometer using spindle No 3 and an operating speed of 60 rpm, without storage of the milled slurry, to at least 400, particularly preferably at least 1000 and not more than 3000, particularly preferably not more than 2000, centipoises. Preferably the milling is controlled so that less than 20% by weight, particularly preferably less than 10% by weight of the pigmentary metal oxide particles are greater than 0.5 microns in diameter.

Preferably, the pigmentary metal oxide surface treated according to the present invention is titanium dioxide produced either by the well-known "sulphate" or "chloride" process.

The slurries provided by the present invention may contain other materials which do not detract from their performance. Small quantities of organic or inorganic structuring agents, for example, such as carboxymethylcellulose, swelling clays or synthetic magnesium silicates having swelling properties may be included in the slurry if desired.

The invention will now be illustrated by means of the following Examples.

The gloss values given herein are obtained as follows.

A pigment slurry was incorporated at a pigment volume concentration of 30% into a standard vinyl silk emulsion paint formulation, obtainable under the Trade Name Vinamul from Vinyl Products Limited coated onto a panel and allowed to dry. A beam of light was shone at an angle of incidence of 60° onto a standard black tile, and the intensity of the reflected light in a line passing through the point of incidence and making an angle of 60° to the normal to the surface of the tile and lying in a plane containing the axis of the beam and the normal, was measured. The tile was then replaced by the panel and the intensity of the reflected light measured as before.

$$\text{The \% Gloss} = \frac{\text{Reflected intensity of paint film}}{\text{Reflected intensity of black tile}} \times 100$$

The viscosity values given herein relate to pigment slurries before incorporation in any paint formulation and are measured in centipoises using a Brookfield Viscometer using the No. 3 spindle except in Example 1 Samples 9 and 10 where spindle No. 4 was used and an operating speed of either 6 rpm (revolutions per minute) or 60 rpm as indicated.

EXAMPLE 1

Titanium dioxide pigment produced by the chloride process was surface-treated with 2.1% by weight of alumina and 0.5% by weight of titania and was recovered from the aqueous surface treatment medium by filtration and washing, but without drying, as a 62.5% solids filter-cake. The cake was mixed with sufficient similarly surface treated titanium dioxide which had been washed and spray-dried to give a 70% by weight solids concentration slurry. A polyanionic dispersant consisting either of sodium polyacrylate (sold by Allied Colloids under the Trade Name Dispex G40) sodium pyrophosphate (sold by Albright and Wilson under the Trade Name Tetron) or sodium polyphosphate (sold by Albright and Wilson under the Trade Name Calgon) and an amine dispersant were added in the quantities indicated, to the titanium dioxide 70% solids concentration slurry and the slurry was then sand milled using a 50% volume sand charge at 2900 revolutions per minute for 30 minutes. The viscosity of the milled pigment slurry was measured as indicated above. milled pigment slurry was then introduced into a standard vinyl silk emulsion paint formulation containing sufficient of the same polyacrylate to bring the total polyacrylate level in the paint to 0.88% by weight based on the surface treated titanium dioxide content thereof. The gloss of the paint was then measured as indicated above.

TABLE 1

| Sample No | Dispersant % of TiO2 in slurry Polyanionic | Amine | Gloss | Viscosity 6 rpm | 60 rpm |
|---|---|---|---|---|---|
| | Polyacrylate | triethanolamine | | | |
| 1 | 0.15 | 0.8 | 63 | | |
| 2 | 0.4 | " | 61 | 11,000 | 1,600 |
| 3 | 0.6 | " | 60 | | |
| 4 | 0.8 | " | 58 | | |
| 5 | 0.4 | None | 52 | | |
| 6 | 0.6 | None | 41 | | |
| 7 | 0.8 | None | 48 | | |
| | | triethylamine | | | |
| 8 | 0.4 | 0.8 | 58 | | |
| | | 2-amino, 2-methyl 1-propanol | | | |
| 9 | 0.4 | 0.26 | 62 | 26,000 | 3,800 |
| 10 | 0.17 | 0.26 | 73 | 36,000 | 4,300 |
| | Pyrophosphate | triethanolamine | | | |
| 11 | 0.08 | 0.8 | 67 | | |
| 12 | 0.2 | " | 62 | | |
| 13 | 0.4 | " | 59 | | |
| 14 | 0.4 | None | 44 | | |
| 15 | 0.4 | 0.4 | 54 | | |
| | Polyphosphate | | | | |
| 16 | x 0.3 | 0.8 | 61 | | |
| 17 | x 0.4 | " | 54 | | |
| 18 | x 0.4 | None | 46 | | | x = Sufficient spray-dried titanium dioxide was added to increase the solids concentration to 75% instead of 70%.

EXAMPLE 2

Titanium dioxide pigment as in Example 1 was surface treated with 1.6% by weight of alumina and 0.5% by weight of titania, was formed into a filter cake, as in that example, having a 62.5% solids concentration, was raised to 67% by weight solids concentration by further filtration, was liquefied by agitation and refiltered to 68–70% by weight solids concentration. 0.08% sodium polyacrylate and 0.8% triethanolamine was added and the resulting material was fed continuously through a sand mill operating at a 50% volume sand charge and 1700 rpm. to give the average retention time stated in the following table. The viscosity of the milled product was measured after various retention times and relevant gloss values were determined. The slurry which had been milled for 12 minutes was stored for specified periods and the viscosity and gloss values remeasured. The results are set out in the following Table.

TABLE 2

| Sample No | Mill Retention | Viscosity 6 rpm | 60 rpm | Gloss | Structure |
|---|---|---|---|---|---|
| | Time (Mins) | pH of slurry at this point 8.9 | | | |
| 1 | 1 | 240 | 114 | 19 | Not a gel |
| 2 | 2 | 480 | 188 | 26 | " |
| 3 | 3 | 700 | 220 | 30 | " |
| 4 | 4 | 860 | 244 | 40 | " |
| 5 | 6 | 640 | 216 | 43 | " |
| 6 | 9 | 1600 | 350 | 53 | Gel |
| 7 | 12 | 2240 | 430 | 58 | " |
| | Storage time (days) (Unagitated) | pH of slurry at this point 8.8 | | | |
| 8 | 28 | Not measured | | 54 | |
| 9 | 49 | 2500 | 310 | 57 | |
| 10 | 77 | Not measured | | 61 | |
| 11 | 151 | 9900 | 1248 | 57 | |
| 12 | 193 | 11,250 | 1400 | 63 | |
| | | pH of slurry at this point 8.3 | | | |

EXAMPLE 3

The pigment slurry of example 1, in which the pigment had been surface-treated with 2.1% by weight of alumina and 0.5% of titania, which contained 0.4% by weight of the titanium dioxide of sodium polyacrylate and 0.8% on the same basis of triethanolamine was subjected to continuous sand milling followed by storage under the conditions used in Example 2 instead of batch sand milling as in Example 1. The alteration in viscosity, gloss and structure with milling time is noted in the following Table.

TABLE 3

| Sample No | Mill Retention | Viscosity 6 rpm | 60 rpm | Gloss | Structure |
|---|---|---|---|---|---|
| | (Mins) | | | | |
| 1 | 3 | 6200 | 900 | 36 | Slight gel |
| 2 | 6 | 8240 | 1,088 | 50 | Gel |
| 3 | 9 | 8560 | 1,144 | 60 | Gel |
| 4 | 12 | 10,600 | 1,410 | 68 | Gel |
| 5 | 15 | 10,800 | 1,460 | 70 | Gel |
| | Storage Time (Unagitated) | | | | |
| 6 | 49 | 11,600 | 1,900 | 65 | |
| 7 | 90 | 15,500 | 3,000 | 65 | |

The gel strength was found to increase progressively for 6, 9, 12 and 15 minutes milling times. After the end of the storage test the 20 liter sample was allowed to flow under gravity through a 3 cm diameter hole from an initial bulk depth of 24 cm. No sediment was found. The same sample was then frozen and maintained at −13° C. for 16 hours. After thawing severe syneresis was found (⅓ slurry volume) but the sediment was easily dispersed on stirring and a gel structure redeveloped. The gloss value given by the sample after this treatment was 55.

EXAMPLE 4

This example was conducted similarly to Example 3 except that the filter cake was raised to 75% by weight solids concentration by the same means and the polyanionic dispersant was 0.6% sodium polyacrylate in one sample (a) and 0.3% of sodium pyrophosphate in another sample (b), each by weight of the titanium dioxide. The resulting slurries were sand milled in the same manner as in Example 3. The particle size of the pigment in the samples altered during the milling as shown in Table 4.

TABLE 4

| Sample (a) milling duration (mins) | % weight 0.5 microns Microns | Sample (b) milling duration (mins) | % weight 0.5 Microns |
|---|---|---|---|
| 3.5 | 21.5 | 3 | 22.4 |
| 8.5 | 9.8 | 5 | 18.3 |
| 22 | 3.4 | 8 | 8.9 |
|  |  | 15 | 6.2 |
|  |  | 18 | 4.0 |
|  |  | 21 | 3.7 |

After the milling the samples showed the following features:

| Sample | Viscosity 6 rpm | 60 rpm | Gloss | Structure |
|---|---|---|---|---|
| (a) | 20,000 | 2900 | 62 | gel |
| (b) | 15,050 | 1420 | 57 | gel |

EXAMPLE 5

The pigment slurry of Example 2 was milled, instead, in a batch sand mill operating at 2900 rpm (sample a) and in a Silversen impeller mixer not utilising any grinding medium (sample b) for various milling times. The gloss values were determined and are given in the following Table.

TABLE 5

| Milling time (Mins) | 5 | 10 | 15 | 30 | 60 |
|---|---|---|---|---|---|
| Sample (a) |  |  | 53 | 61 | 66 |
| Sample (b) | 20 | 20 | 20 |  |  |

EXAMPLE 6

Titanium dioxide pigment produced by the sulphate process was surface-treated with 2.1% alumina, 1.5% titania and 1.0% silica and was recovered as a washed filter cake containing 52.5% by weight solids. This cake was raised to 67% by weight solids concentration by the addition of similarly surface-treated spray dried sulphate process titanium dioxide. Samples were dispersed with varying quantities of sodium polyacrylate and 0.8% of triethanolamine by weight of the titanium dioxide. The gloss and structure of the various samples after batch sand milling for 30 minutes at 2900 rpm are given in the following Table.

TABLE 6

| Sample No | % Polyacrylate | Gloss | Structure |
|---|---|---|---|
| 1 | 0.08 | 48 | Gel |
| 2 | 0.2 | 41 | Weak gel |
| 3 | 0.5 | 42 | Slight gel |

Sulphate process titanium dioxide surface treated with 2.0% alumina and 1.5% titania but no silica, which had been raised to the same solids concentration as above by pressure filtration to 68% solids followed by adjustment by dilution to 67% which had been dispersed in the presence of 0.4% sodium polyacrylate and 1.0% triethanolamine gave a gloss after the same sand milling of 57 and had a full gel structure.

We claim:

1. A process for the production of an aqueous dispersion of pigmentary titanium dioxide particles characterised by forming an aqueous dispersion of washed pigmentary titanium dioxide particles which have been surface treated with from 1.0 to 4.0% of alumina, raising the solids concentration of the said alumina surface-treated titanium dioxide particles to above 60% by weight, introducing into the dispersion, before or after the solids concentration thereof has been raised, a combination of dispersants comprising an amine dispersant in from 0.3% to 3.0% by weight of the alumina surface treated titanium dioxide, and an anionic dispersant in from 0.04% to 0.75% by weight of the alumina surface treated titanium dioxide and milling the raised solids concentration dispersion, containing the said combination of dispersants, in the presence of grinding elements to raise the gloss value given by the dispersion to at least 50 and the Brookfield viscosity value using spindle No. 3 and 60 r.p.m. given by the dispersion to from 400 to 3000.

2. A process as claimed in claim 1 wherein the anionic dispersant is a polyacrylate, polyphosphate pyrophosphate, citrate, silicate or tartrate.

3. A process as claimed in claim 2 wherein the anionic dispersant is in the form of a sodium, potassium or ammonium salt.

4. A process as claimed in claim 1 wherein the amine dispersant is a secondary or tertiary amine.

5. A process as claimed in claim 4 wherein the amine dispersant is an alkanolamine.

6. A process as claimed in claim 4 wherein the quantity of the amine dispersant is not more than 2% by weight of the alumina surface-treated metal oxide particles.

7. A process as claimed in any preceding claim wherein the raised solids concentration dispersion containing the combination of dispersants is milled until less than 20% by weight of the pigmentary metal oxide particles are greater than 0.5% microns in diameter.

8. An aqueous dispersion of pigmentary titanium dioxide particles surface treated with from 1.0% to 4.0% of alumina, the dispersion having a concentration of said alumina surface-treated titanium dioxide particles of above 60% by weight and containing a combination of dispersants comprising an amine dispersant in at least 0.3% and not more than 2% and an anionic dispersant in at least 0.04% less than 0.6% by weight of the alumina surface-treated metal oxide particles less than 20% of the said alumina surface-treated metal oxide particles having a particle size greater than 0.5 microns in diameter, the dispersion giving a % gloss value of at least 50 and a Brookfield viscosity value, using spindle No. 3 and 60 r.p.m., of from 400 to 3000.

* * * * *

UNITED STATES PATENT AND TRADEMARK OFFICE
CERTIFICATE OF CORRECTION

PATENT NO. : 4,448,609
DATED : May 15, 1984
INVENTOR(S) : Brian Tear and David G. Othen It is certified that error appears in the above-identified patent and that said Letters Patent is hereby corrected as shown below:

Face Page, in the Title; "TITONIUM" should read -- TITANIUM --.

Col. 6, line 12 of TABLE 3; insert -- (Days) -- under "(Unagitated)"

Signed and Sealed this

Fourth Day of December 1984

[SEAL]

Attest:

GERALD J. MOSSINGHOFF

Attesting Officer    Commissioner of Patents and Trademarks